Aug. 3, 1965     A. W. WISEMAN     3,198,003
GAGING APPARATUS

Filed May 9, 1960     2 Sheets-Sheet 1

INVENTOR
Arthur W. Wiseman
BY Ernest J. Hix
ATTORNEY

Aug. 3, 1965  A. W. WISEMAN  3,198,003
GAGING APPARATUS
Filed May 9, 1960  2 Sheets-Sheet 2

INVENTOR
Arthur W. Wiseman
BY Ernest J. Hit
ATTORNEY

United States Patent Office 3,198,003
Patented Aug. 3, 1965

3,198,003
GAGING APPARATUS
Arthur W. Wiseman, Xenia, Ohio, assignor to The Sheffield Corporation, Dayton, Ohio, a corporation of Delaware
Filed May 9, 1960, Ser. No. 27,657
2 Claims. (Cl. 73—37.9)

This invention relates to gaging apparatus and more particularly to a gaging apparatus for recording measured product characteristics on a record chart.

In the precision measurement of product characteristics such as part dimensions, fibre fineness, porosity, etc. it is frequently necessary to record the measurement results. Where this is done manually, demands upon the operator's dexterity in simultaneously measuring and recording, or upon his accurate recollection in measuring, observing and then recording, reduce the efficiency of the operation and introduce elements of human error into a precision measuring process. Prior known automatic recording devices have either been provided for special applications, are complex and expensive, or are not efficiently adapted to sequential measuring operations.

It is accordingly an object of this invention to provide an apparatus for the precision gaging and automatic recording of product characteristics, which apparatus is economical in construction, of broad application, and especially adapted for sequential gaging operations.

It is a further object to provide such an apparatus wherein the responses of a gaging circuit are automatically recorded on a record chart, the drive for advancing the chart being controlled in response to the gaging operation for automatic chart advance in a predetermined timed relation thereto.

It is a further object to provide a gaging and recording apparatus wherein the chart drive is controllably connected to the gaging circuit to automatically provide predetermined incremental chart advance between gaging and recording operations, whereby the gaging results are rapidly made and recorded in a clearly separable manner, and without operator interference or the likelihood of human error.

It is a further object to provide such an apparatus including a pneumatic gaging circuit wherein pressure changes are obtained within a gaging range during measurement applications, indicia being automatically marked on a record chart in response to the gaging pressures indicative of the magnitude of the gaged characteristic, and control means being provided automatically responsive to pressures within the circuit outside the gaging range for automatic incremental advance of the record chart between measurement applications.

Figure 1:
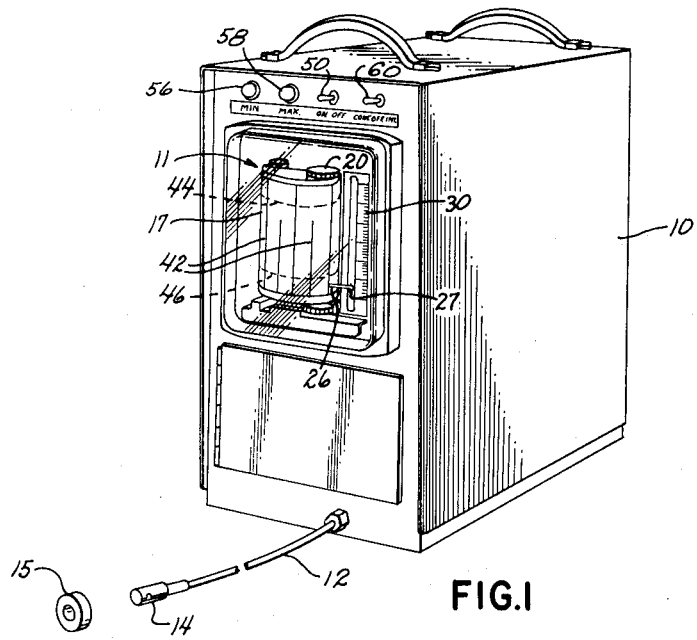
Figure 2:
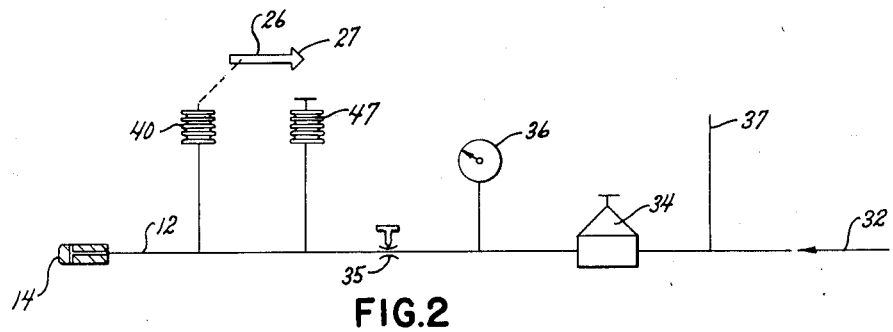
Figure 3:
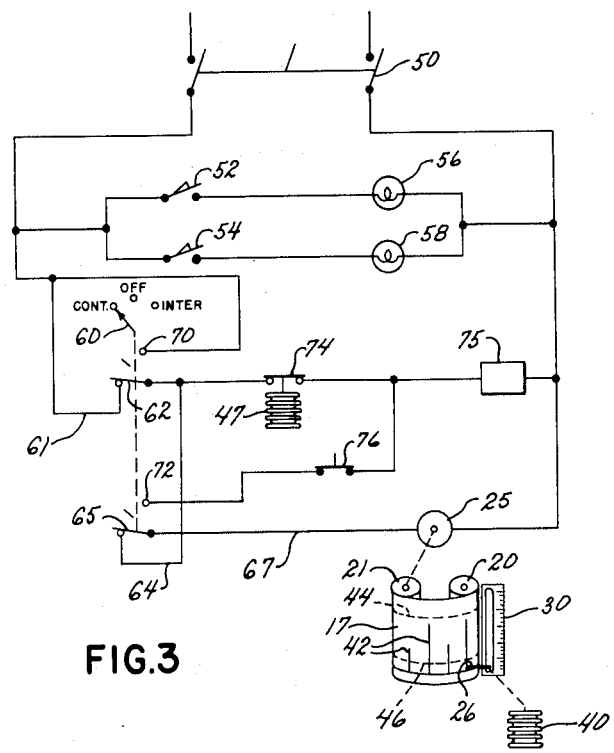
Figure 4:
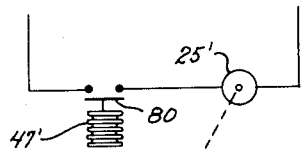

Other objects and advantages of the invention will be apparent from the following description, the appended claims, and the accompanying drawing, in which, FIGURE 1 is an illustration, in perspective, of a gaging apparatus for recording measured product characteristics, embodying the present invention, FIGURE 2 is a diagram of a pneumatic circuit used in the apparatus of FIGURE 1, FIGURE 3 is an exemplary electrical control circuit, and FIGURE 4 is a modified fragment of the electrical control circuit of FIGURE 3.

As illustrated, a commercially available recorder (Taylor 90J Series) is used in conjunction with unique pneumatic and electric circuitry to provide an exemplary embodiment of the present invention. For this reason details of the recorder itself have been disclosed only to the extent of indicating its relation to the illustrated circuitry.

As seen in the perspective of FIGURE 1, cabinet 10 houses not only the recorder 11 but also the associated pneumatic and electric circuitry later described. Electric and pneumatic supply lines are provided to the circuitry within cabinet 10 and a pneumatic gaging conduit 12 leading therefrom terminates in a gage head 14 provided, in this exemplary application, for measuring the internal diameter of a ring 15.

Pressure changes in the pneumatic gaging circuitry which are obtained when ring 15 is placed on gage head 14 are reflected in record markings on a strip chart 17, which markings are indicative of the internal diameter of the exemplary part.

Record chart 17 is advanced between rollers 20 and 21 by an electric motor 25 (see FIGURE 3). The marking means for recording indicia on the chart include a marking pin 26. At the inner end of pin 26 a pointer 27 is positioned along a calibrated scale 30 to also provide a visual indication of the measured dimension.

The pneumatic circuit of FIGURE 2 is supplied with air from a suitable source indicated at 32. The air flows through a pressure controlling regulator 34, an adjustable restrictor 35, and through conduit 12 to atmosphere through the opposed orifices of diameter measuring gage head 14. Varying clearances between the part 15 and head 14 result in different pressures downstream of restrictor 35 which vary within a gaging range dependent upon the measured dimension. Pressure gage 36 is used in setup and a supplementary connection 37 leads to servo-equipment for operating the recorder 11. The pressures obtained downstream of restrictor 35 are applied to a pressure responsive means of recorder 17 shown diagrammatically in FIGURE 2 as bellows 40. Expansions and contractions of bellows 40 result in vertical positioning of pin 26 and marking of indicia on chart 17 to record the measurement. As seen in FIGURES 1 and 3 the vertical lines 42 transverse the direction of chart advance have a height which is dependent upon the measured dimension. Horizontal lines 44 and 46 imprinted on chart 17 respectively represent the maximum and minimum tolerance limits of the bore being gaged. Movements of chart 17 are controlled in response to the gaging operations by pressure responsive means 47 as later described.

In FIGURE 3 the controlling circuitry for the apparatus is shown. It includes on and off power switch 50. Limit switches 52 and 54 are provided in the commercially available recorder. These limit switches are operated through movements of pin 26 at predetermined positions and, in this instance, serve to control maximum and minimum tolerance lights 56 and 58 to signal when the dimension gaged is above or below the allowable ring.

A three position switch 60 controls the manner of advance of chart 17 by motor 25. In its centered or "Off" position all circuits to motor 25 and the associated controlling circuit are broken. For a continuous operation of motor 25 with continuous advance of chart 17, switch 60 is moved to its "Continuous" position. The circuit of FIGURE 3 is in this condition. A circuit is completed through line 61, switch element 62, line 64, switch element 65, and line 67 to motor 25.

When it is desired to operate motor 25 and advance chart 17 intermittently in response to the gaging operation, switch 60 is positioned to its "Intermittent" position, thus positioning switch element 62 to contact 70 and element 65 to contact 72.

Through the gaging pressure range pressure responsive means 47 maintains switch element 74 in a raised position, breaking the circuit. However, when upon removal of head 14 from ring 15, the pressure downstream of restrictor 35 drops below the gaging range, bellows 47 contracts and element 74 lowers to complete a circuit to timer 75. Timer 75 momentarily closes switch 76 for a predetermined period and then opens it. During its momentary closing, switch 76 completes a circuit through contact 72, switch element 65, and line 67 to motor 25 to advance chart 17, equally separating the recorded dimensions.

Thus in this application chart 17 is stationary when gage head 14 is inserted into ring 15. The resulting pressure change in the pneumatic circuitry causes marking pin 26 to move vertically through a magnitude of movement determined by the internal bore diameter. Upon removal of head 14 the pin drops and the chart advances. Each measuring movement of pin 26 produces a line-like record, equally spaced from the others so the record indicia are compactly presented but clearly and separable.

Where record compactness is not important and a record of gaging time is desired, a modified circuit shown in fragment in FIGURE 4 can be used. Pressure responsive bellows 47', connected to the circuit of FIGURE 2 in a manner similar to that for bellows 47, expands in response to pressures downstream of restrictor 35 within the gaging range. This results in elevation of switch element 80, thus closing the circuit to motor 25' so that chart 17 is advanced only during the gaging operation. This results in a horizontal marking on chart 17 which has an elevation transverse the chart dependent on the magnitude of the gaged dimension and a length determined by the gaging time. Measurements are segregated by the dropping movement of the pin between gaging applications of head 14.

In the exemplary circuit disclosed and just described in detail pressures drop below the gaging range upon removal of head 14 from the part 15. In some instances pressure falls upon placement of the head in association with the part and is above the gaging range between gaging operations. In these conditions a modified pressure responsive switch in the circuit of FIGURE 3 is required where the element 74 would be closed only at pressures above those existing during gaging rather than below as in the present instance.

Thus it is seen that a gaging apparatus for recording measured product characteristics has been provided which makes possible a clear and legible sequential recording of measured dimensions and the like. Through the unique circuitry provided recording indicia are imprinted on a record chart in predetermined timed relation to a gaging operation. Thus the operator is freed, and the human element is eliminated, for more accurate recording of gaging data and reduced operator fatigue.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A gaging apparatus for recording measured product characteristics on a record chart, comprising, recording means including a chart drive for advancing a record chart in a first direction, marking means for recording indicia on said chart displaced transverse said first direction in accordance with the magnitude of the gaged characteristic, a pneumatic gaging circuit for connection at one end to a source of air under pressure and at the other end to a gage head controlling flow in accordance with the gaged characteristic, said circuit providing pressure changes within a gaging range in response to the magnitude of the gaged characteristic, first pressure responsive means connected for response to said pressure changes for displacing said marking means in accordance therewith, second pressure responsive means connected to said gaging circuit for response to pressure changes outside said gaging range operatively connected for controlling said chart drive to automatically advance said chart between recording displacements of said marking means while maintaining the chart stationary during recording, and timing means controlling each chart advance to provide a predetermined repeated spacing between the record indicia.

2. A gaging apparatus for recording measured product characteristics on a record chart, comprising, recording means including a chart drive for advancing a record chart in a first direction, marking means for recording on said chart including a marking element displaced transverse said first direction in accordance with the magnitude of the measured characteristic, a pneumatic gaging circuit including, in sequence, means for connection to a source of air under pressure, a pressure regulator, a restrictor, and a gage head at the other end thereof for gaging association with the product to be measured whereby pressure changes are obtained between said restrictor and said gage head determined by the gaged characteristic, first pressure responsive means connected for response to the pressure between said restrictor and said gage head for controlling said marking means to position said marking element in accordance with the pressures obtained and the measured characteristic, and a second pressure responsive means connected for response to the pressure between said restrictor and said gage head, and timing means responsive to said second pressure responsive means and controllably connected to said chart drive for control thereof to obtain predetermined advance movements of said chart in timed relation to each gaging application of said gage head.

References Cited by the Examiner
UNITED STATES PATENTS

| | | | |
|---|---|---|---|
| 1,254,062 | 1/18 | Olson et al. | 33—179.5 |
| 2,374,154 | 4/45 | Moore. | |
| 2,845,792 | 8/58 | Eisenhardt | 73—37.9 |

ISAAC LISANN, *Primary Examiner.*

ROBERT L. EVANS, *Examiner.*